US006990677B1

(12) United States Patent
Pietraszak et al.

(10) Patent No.: US 6,990,677 B1
(45) Date of Patent: Jan. 24, 2006

(54) APPLICATION PROGRAM INTERFACES FOR ELECTRONIC PROGRAM GUIDE DATA SERVICES

(75) Inventors: Michael E. Pietraszak, Redmond, WA (US); Robert M. Fries, Redmond, WA (US); Robert S. T. Gibson, Monroe, WA (US); Jonathan A. Wray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/527,137

(22) Filed: Mar. 16, 2000

Related U.S. Application Data

(60) Provisional application No. 60/125,062, filed on Mar. 18, 1999.

(51) Int. Cl.
 *H04N 5/445* (2006.01)
(52) U.S. Cl. ...................................................... 725/49
(58) Field of Classification Search .................. 725/49; 709/250; 719/328, 331, 332, 321, 322; H04N 5/445
 See application file for complete search history.

(56) References Cited

U.S. PATENT DOCUMENTS

| | | | | | |
|---|---|---|---|---|---|
| 5,550,576 | A | * | 8/1996 | Klosterman ................... | 725/46 |
| 5,557,724 | A | * | 9/1996 | Sampat et al. ................. | 725/43 |
| 5,635,989 | A | | 6/1997 | Rothmuller .................. | 348/563 |
| 5,684,525 | A | | 11/1997 | Klosterman ................... | 348/12 |
| 5,818,935 | A | * | 10/1998 | Maa ........................... | 380/200 |
| 5,850,218 | A | * | 12/1998 | LaJoie et al. .................. | 725/45 |
| 5,990,883 | A | * | 11/1999 | Byrne et al. .................. | 345/721 |
| 6,157,411 | A | * | 12/2000 | Williams et al. ............. | 348/552 |
| 6,216,134 | B1 | * | 4/2001 | Heckerman et al. ..... | 707/104.1 |
| 6,536,041 | B1 | * | 3/2003 | Knudson et al. .............. | 725/39 |
| 2001/0000194 | A1 | * | 4/2001 | Sequeira ....................... | 725/39 |

FOREIGN PATENT DOCUMENTS

| EP | 0 751 655 | 1/1997 | ....................... 29/6 |
|---|---|---|---|
| WO | 97 48228 | 12/1997 | .................... 5/445 |

OTHER PUBLICATIONS

Firesmith, Donald, "An Expanded View of Messages", ACM Press, New York, NY, vol. 4, issue 3 (Jul. 1993), p. 2-5.*

* cited by examiner

*Primary Examiner*—Christopher Grant
*Assistant Examiner*—Andrew Y. Koenig
(74) *Attorney, Agent, or Firm*—Workman Nydegger

(57) ABSTRACT

EPG services are provided, which enables a device such as a computer, a set top box or the like to collect EPG data from multiple EPG data providers or sources. The EPG data is collected at the device by EPG loaders. Each EPG loader collects EPG data from a particular source. The EPG loaders deliver the EPG data to a writer module, which performs scaling and formatting functions to the EPG data. The writer module also stores the scaled and formatted EPG data in a database or other storage. The writer module may also be implemented by chaining EPG loaders in a priority scheme. However, EPG loader interaction reduces independence and forces more rigid interface and implementation constraints upon the design of EPG loaders. Once stored, applications gain access to the EPG data through a control module. The control module provides the accessed EPG data to the applications. EPG services function to isolate the operation of the applications from the EPG data sources. Because the EPG data is stored by the writer module and accessed by the control module, the applications and EPG data sources can change independently of one another without having an effect on the ability of EPG services to collect and provide access to EPG data.

70 Claims, 3 Drawing Sheets

APPLICATION PROGRAM INTERFACES FOR ELECTRONIC PROGRAM GUIDE DATA SERVICES

RELATED APPLICATIONS

This application claims the benefit of U.S. Provisional Application Ser. No. 60/125,062, filed Mar. 18, 1999, and entitled "Filtering, Scaling, and Loading of Electronic Guide Data," which is incorporated herein by reference. This application is also related generally to U.S. patent application Ser. No. 09/527,313 entitled "Systems and Methods for Electronic Program Guide Data Services," which was filed on the same day as the present application, and is incorporated herein by reference.

BACKGROUND OF THE INVENTION

1. The Field of the Invention

The present invention relates to electronic program guides (EPGs). More specifically, the present invention relates to application program interfaces enabling EPG data sources and applications using EPG data to interface with EPG services.

2. The Prior State of the Art

Electronic program guides (EPGs) are designed to permit television viewers as well as Internet webcast viewers to browse and select from television listings which are displayed on a television screen. Before being displayed, the EPG data is downloaded from an EPG source such as a head end or a server to a destination device such as a television, computer or set top box. The EPG source, which may receive EPG data from a number of different EPG data providers, usually consolidates and encrypts the EPG data before transmitting it to the destination device. In conventional systems, the destination device is only capable of receiving EPG data from only one EPG data source, which indicates that the destination device must accept the format of the EPG data provided by the EPG source. More importantly, the EPG data received by a user cannot be tailored to that user's particular tastes.

The ability to retrieve data from a single source in a particular format is not the only drawback of this arrangement. Many destination devices which receive interactive EPG data have limited storage capacity. For this reason, the EPG data downloaded from a data broker or source is typically compressed such that the destination device may store more EPG data in the limited storage space. This selective compression is primarily performed, however, by the EPG data source. This leaves the destination device with the ability to only alter the amount of EPG data downloaded as opposed to the content of the downloaded EPG data.

In addition to being unable to alter the content of the downloaded EPG data, a destination device is limited in other significant ways. EPG data from multiple EPG data providers must first be collected and consolidated by a particular EPG source before it is downloaded to a destination device. Destination devices are only capable of receiving EPG data from a single EPG data source. Because destination devices can only receive from one data provider, destination devices are limited to a single data transmission format.

Another limitation of current destination devices is that the applications on the destination device that utilize the EPG data must be updated when the EPG data source is changed or altered. Additionally, the applications on the destination device must also be updated when the format of the data source is altered or changed. EPG data is currently being transmitted by various EPG data sources across various transport mediums, but destination devices are unable to take advantage of these sources and mediums because destination devices are limited to one data provider and one format.

EPG data typically includes a title, a description and attributes such as closed captioning, rating, and the like. EPG data can be collected from in-band and out of band television signals, HTTP or FTP, TCP/IP sockets or any other communications protocol. The internet, in particular, has become a significant source of EPG data. In fact, EPG data is expanding to include reviews of programs, the names of the actors, and other types and classes of information. Much of this information is readily available, but destination devices are frequently unable to take advantage of that information because, as previously mentioned, the destination devices are limited to a particular EPG data source and a particular EPG data format.

It would be an advance in the art for a destination device to be able to receive EPG data from multiple EPG data sources and not be confined to a particular EPG data source or EPG data format. It would also be an advance in the art for a destination device to be able to tailor the content of the EPG data by permitting the EPG data to be scaled both temporally and extensibly. Scaling the EPG data in this manner provides a user, at a minimum, with EPG data that is tailored to the user.

SUMMARY OF THE INVENTION

The present invention provides EPG services which allows destination devices to overcome present limitations by enabling a destination device to receive EPG data from multiple EPG data sources or providers, including web sites and other conventional EPG data providers. In order to receive EPG data from multiple EPG data sources, a software loader module is loaded or initiated for each EPG data source. The loader module is capable of retrieving EPG data from a particular EPG data source in its native transmission format. The loadable modules interface with an EPG writer module that collects the EPG data from the loader modules and stores the retrieved EPG data locally on the destination device.

The interface or EPG writer module comprises a writer application program interface (API) that establishes a standard access point for each loader module. This permits a single EPG writer module to interface with the loader modules of multiple EPG data sources. In this manner, a destination device can receive EPG data from multiple EPG data sources which have different transmission mediums and formats, because a loader module may be created or adapted to each separate EPG data source. The loader modules may receive EPG data in different formats, but all loader modules interface with the EPG writer.

Once the EPG data has been locally stored on the destination device by the EPG writer or the EPG writer API, an application may access the EPG data via a controller module which comprises a controller API. The controller API is an interface that allows many different applications to access the locally stored EPG data. The writer API and the controller API also allow applications to be independent of the EPG data sources. This independence allows an application to continue to have access to EPG data even if the EPG source or the format of the EPG data provided by the EPG source is changed.

EPG services also introduces significant scalability to the EPG data. Typically, the EPG data stored by EPG services is for a particular time period dictated by the supplier of the EPG data. EPG services allows this time period to be adjustable by a user or an application. For example, a device application developer or a user may choose a time period of 2 days to conserve memory on the destination device even if the EPG data source provides a 5 day block of EPG data. A device application developer or a user may also choose to alter the amount of data stored for titles, descriptions, and other program attributes. The settings selected by a developer or an end-user can be applied to a specific channel, to favorite channels, or to all channels. In other words, the EPG data stored by EPG services can be customized to a particular application or user. At a minimum, a user is provided with enhanced EPG data listings that can be tailored by the user by many factors including but not limited to content, time, and geography.

The ability to tailor the content of EPG data using these attributes significantly enhances how a user may make use of EPG. For example, an application developer or a user may decide to download detailed information for programs occurring in the next two days and to download less detailed information for programs occurring on days three through five. In this example, the EPG data is temporally scaled or customized by the application. In addition to being able to temporally scale or filter EPG data, EPG services allows EPG data to be scaled by several factors including, but not limited to, channel, richness, language, and time.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
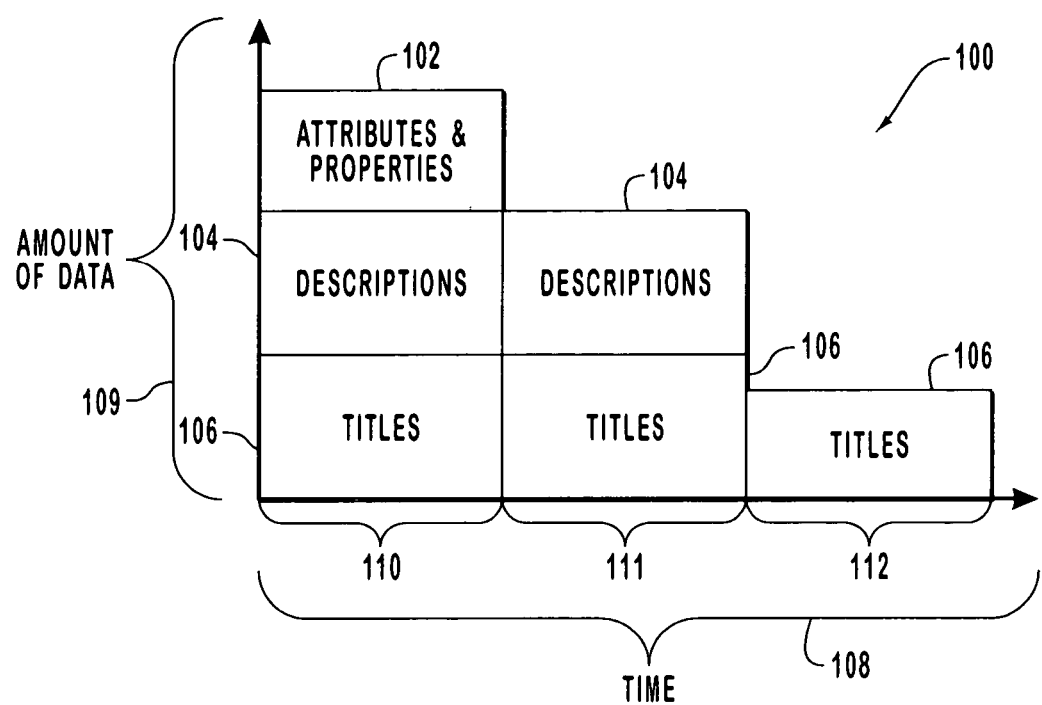
FIG. 1 is a block diagram illustrating the scalability and extensibility of EPG data which is downloaded by a destination device implementing one embodiment of the present invention.

Electronic program guides (EPGs) are used to convey data to a user. Primarily, the data typically transmitted by an EPG data source is related to television programming and may include the titles of the television programs, the descriptions of the television programs, and other attributes and properties of the television programs. The EPGs are usually developed by EPG data providers that are responsible for the content of the EPG data. For instance, EPG data provided by an EPG data provider may be devoted exclusively to movie channels or EPG data can be devoted to public or free television channels. Currently, a recipient of EPG data is restricted to the format and content of a single EPG data provider.

EPGs, however, can also be used to convey other types of information such as radio schedules, Internet streaming media event schedules, information related to the Internet, or the content of the Internet. This document focuses on EPG data relating to television programming, but other data that may be included in EPGs is within the scope of the present invention. The television programming represented by EPG data is frequently displayed in table form. Each row of the table contains a type of information such as the title of the television programs, or a description of the television program, while each column is usually represents a time period or time block. As described previously, a destination device is currently unable to alter these characteristics and must accept the EPG data as it is formatted by an EPG data source.

EPG services overcomes the limitations of the prior art in at least two ways. Instead of simply receiving what an EPG data provider is transmitting, EPG services allows incoming EPG data to be extensibly scaled according to a several different factors or axes. For example, if the EPG data is temporally scaled, EPG services may receive detailed EPG data about television programs airing in the near future and coarse EPG data related to television programs airing further in the future.

In addition, EPG services permits a recipient of EPG data to determine the amount of descriptive EPG data such as titles, descriptions and attributes that is received. For television programs airing in the near future, the EPG data may be rich in content by including detailed descriptions while the EPG for television programs airing in the more distant future may include the titles and exclude the descriptions.

In addition to providing temporal and selective scalability, EPG services is capable or receiving EPG data from more than one EPG data source or provider. EPG services provides a loader module for each EPG data source and an abstraction layer or writer interface that interfaces with all of the loader modules. The writer interface or abstraction layer allows the EPG data received by the loader modules to be stored in the memory or storage of the destination device. Applications may then access the EPG data through another abstraction layer or control interface. The EPG data source or provider may change over time, but the application using EPG data provided by that source or provider is unaffected by those changes because the EPG data is accessed through EPG services rather than from the EPG data source or provider directly. Correspondingly, the application can be updated without regard to the EPG data provider, because the EPG data is stored via the writer interface.

The invention is described using block diagrams and flow charts. Using the block diagrams and flow charts in this manner to describe and represent the invention should not be construed as limiting the scope of the invention. Rather, the block diagrams and flow charts are intended to illustrate exemplary embodiments of the present invention.

The embodiments of the present invention may comprise a special purpose or general purpose computer comprising various computer hardware. Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EPROM, CD-ROM or other optical disk storage, magnetic disk storage or other magnetic storage devices, or any other medium which can be used to store the desired executable instructions or data structures and which can be accessed by a general purpose or special purpose computer, such as one included in a set top box. Computer-readable media may also include remote data stores such as web servers and other remotedata stores. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Although not required, the invention can be described in the general context of computer-executable instructions, such as program modules, being executed by one or more processors included, for example, in a set top box. Generally, program modules include routines, programs, objects, components, data structures, etc. that perform particular tasks or implement particular abstract data types. Moreover, those skilled in the art will appreciate that the invention may be practiced with other computer system configurations, including general purpose computers, personal computers, hand-held devices, multi-processor systems, microprocessor-based or programmable consumer electronics, network PCs, minicomputers, mainframe computers, and the like.

As used herein "EPG data" refers to television programming information, radio programming information, Internet content, scheduling information, titles, descriptions, movie reviews, ratings information, MPEG Streams, and any other type of data that may be retrieved from a source by an electronic device. The embodiments of the present invention described herein refer to television programming information, but the embodiments of the present invention easily extend to other types of EPG data. As used herein "digital recording" refers to copies of recordings of the data represented by the EPG data and includes but is not limited to television programming, radio programming and the like.

Figure 2:
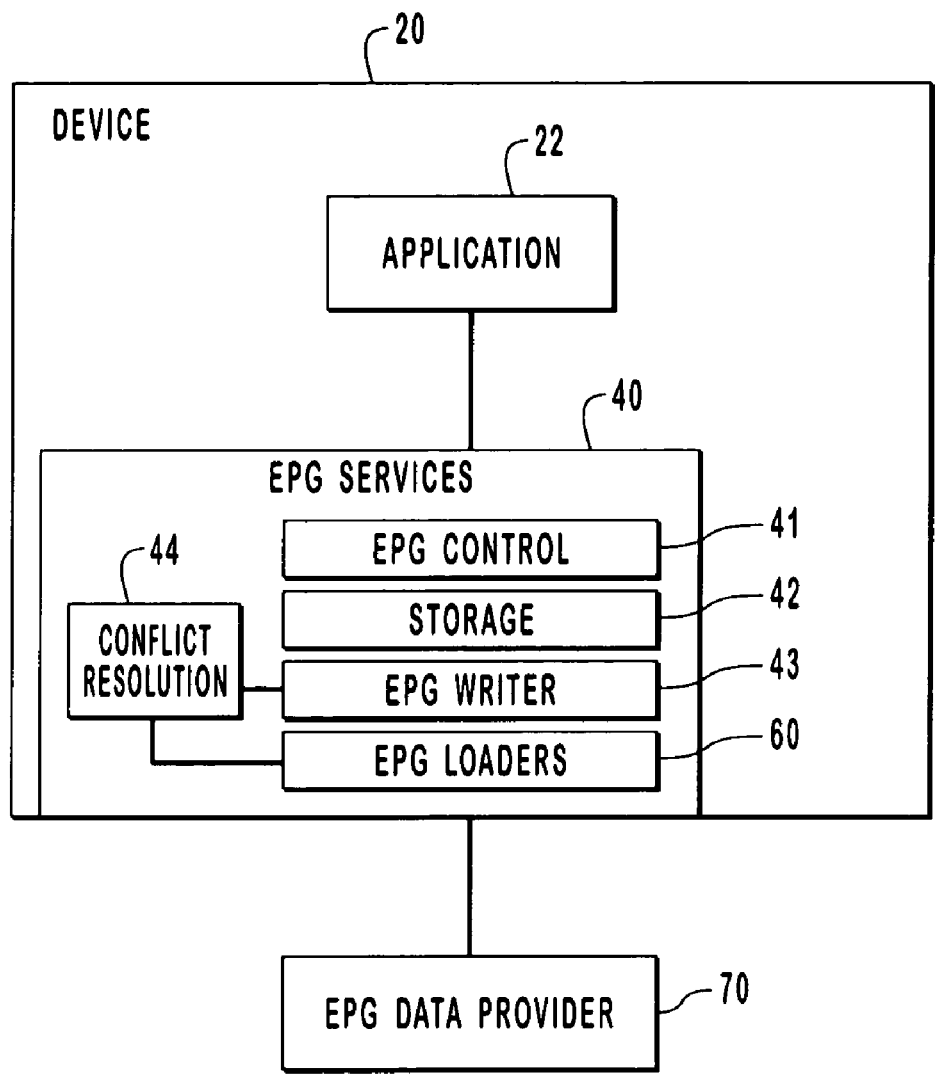
FIG. 2 illustrates an exemplary system for implementing EPG services.

FIGS. 1 and 2 illustrate generally some of the advantages provided by EPG services. The overall purpose of EPG services is to collect remote and transient EPG data and store it to provide applications with fast access, rich content, and querying capabilities for the collected EPG data. For devices having high speednetwork connectivity, the EPG data may also be collected and accessed remotely. EPG services achieves these objectives by: allowing the EPG data to be scaled according to many different factors or axes; providing extensibility such that new sources and types of EPG data may be accessed; providing components or modules to collect the EPG data from EPG data sources and providers; and providing components or modules to access the EPG data that has been retrieved and stored by EPG services.

FIG. 1 is a block diagram illustrating a portion of the scalability that EPG services provides for EPG data. The EPG data in FIG. 1 comprises titles 106, descriptions 104 and attributes 102. Titles 106, descriptions 104 and attributes 102 are each an example of EPG data and the combination of titles 106, descriptions 104 and attributes 102 is also an example of EPG data. EPG data may be retrieved from more than one EPG data source or provider, but the EPG data that is stored by EPG services may differ from the EPG data that was received from the EPG data source. Thus the amount of EPG data retrieved from a particular EPG that is actually stored can vary from completely excluding the EPG data to completely including the EPG data of a particular source. The EPG data illustrated in FIG. 1 is intended to be illustrative of EPG data in general and does not exclude additional information from being included in the EPG data made available by other EPG data sources and providers.

EPG data may be scaled, in this example, according to the factors or axes of time, richness, channels and language. In FIG. 1, time 108 is depicted as the horizontal axis of EPG table 100. Typically, EPG data is stored for two to seven days, but time 108 can be adjusted in one minute intervals to any desired interval. In addition, time 108 can be divided into shorter time intervals. The richness of the EPG data refers to the amount of data that is stored for television program titles, descriptions and attributes and the like. The richness of to time 108. Thus, various intervals of time 108 may have varying levels of richness.

The channels is another scalable factor. In a default condition, EPG data is stored for viewable channels and no EPG data is stored for hidden or test channels. A user, however, may choose to remove a particular channel from the EPG data. In one embodiment, a removed channel is treated differently from a test or hidden channel. EPG data is still stored for removed channels, but the EPG data is not necessarily displayed to a user or an application. Another aspect of the scalability of EPG services is related to favorite or preferred channels. A channel that is designated as preferred or favorite may have EPG data that is more rich than the EPG data stored for other channels. In addition, a user has the ability to exclude certain channels or other attributes from being included in the EPG data.

The EPG data is also scalable with regard to language. This setting only applies, however, to the storage of textual data that describes a television program. The language used in the programming itself does not affect the scalability of the EPG data. The language setting only permits EPG data to be stored if the language matches the system language preferences. The described scalability factors of time, richness, channels and language are exemplary factors and do not limit the factors with which EPG data may be scaled.

EPG data table 100 in FIG. 1 further illustrates an example of EPG data that has been scaled according to richness and time. The amount of data 109 is, in this illustration, indicative of the richness of the EPG data. Column 110 contains attributes 102, descriptions 104 and titles 106. The time period for column 110 is, in this example, the next two days of EPG data. The EPG data in column 110 is rich in that descriptions 104 are extremely detailed, titles 106 are complete, and many attributes 102 are detailed. Exemplary attributes include closed captioning, rating, stereo and more.

Column 111 is indicative, in this example, of a time period from day 3 to day 5. As illustrated, the amount of data 109 is less and is coarser or less rich than the EPG data stored in column 110. Descriptions 104 in column 111 are not as detailed, but titles 106 are still complete and column 111 contains no attributes 102. Similarly, column 112 is indicative of a time period from day 6 to day 7. Only titles 106 are stored in column 112. Thus the EPG data stored in column 112 is less rich than the EPG data in column 111. EPG data table 100 therefore illustrates EPG data that has been scaled with respect to time and richness or content.

The following table is another illustration of EPG data that has been scaled according to time, richness, and channel. The EPG data displayed to a user will reflect the EPG data indicated in the following table.

| Channel Type | EPG Data | Time |
| --- | --- | --- |
| Channels Hidden by | Title | Do not store |
| EPG Data Provider | Description | Do not store |
|  | Attributes | Do not store |
| Normal Channels | Title | Store 4 days |
|  | Description | Store 3 days |
|  | Attributes | Store 2 days |
| Favorite Channels | Title | Store 5 days |
|  | Description | Store 5 days |
|  | Attributes | Store 5 days |

The above table illustrates a scenario where no EPG data is stored for hidden channels, the richness of the EPG data stored for normal channels is greater for television programs airing in the near future, and the EPG data stored for favorite channels is very rich for the entire time period stored. In this manner, the EPG data can be scaled and stored in a variety of different combinations using a variety of factors. EPG services allows EPG data to be custom tailored for a particular application or user. Channels or other attributes or descriptions that are not of interest to a particular application or user may be excluded.

FIG. 2 is a block diagram illustrating an exemplary system capable of implementing one embodiment of the present invention. FIG. 2 illustrates a device 20, which may be a set top box, a computer, a video cassette recorder, a television tuner, a modem, a digital satellite tuner, or any other device capable of receiving EPG data. Device 20 receives EPG data from EPG data provider 70. Exemplary EPG data providers or sources include television stations, Internet Service Providers (ISPs), and satellites. The EPG data may be transferred via in-band television signals, out-of-band television signals, Hyper Text Transfer Protocol (HTTP), File Transfer Protocol (FTP), Transmission Control Protocol/Internet Protocol (TCP/IP) sockets, or any other communication protocol.

Device 20 typically has at least one application 22 which is capable of utilizing the EPG data provided by EPG data provider 70. EPG services 40 acts as an intermediary between EPG data provider 70 and application 22. In this manner, both application 22 and EPG data provider 70 may change independent of the other without creating an incompatibility that may render application 22 incapable of receiving EPG data because EPG data provider 70 and application 22 interact with EPG services 40 rather than with each other.

One embodiment of EPG services 40 provides pluggable modules for EGP loaders 60, EPG writer 43, storage 42, and EPG control 41. EPG loaders 60 provide the ability to receive EPG data from EPG data providers. As new EPG data providers become available to device 20, a new EPG loader 60 is added to EPG services 40. The EPG loader added to the system for the new EPG data provider is capable of collecting the EPG data from the new EPG data provider. For example, an EPG loader 60 may be added to EPG services 40 which is capable of retrieving or collecting movie review data from an HTTP address. In addition, EGP loaders 60 can be added and removed from EPG services 40 as needed. When an EPG data provider 70 is no longer available, for example, the EPG loader corresponding to that EPG provider is removed from EPG services 40.

EPG writer 43 is a component or module that stores the EPG data collected by EPG loaders 60 in storage 42 which is a database containing EPG data in one embodiment. Storage 42 is also an example of a computer-readable medium. EPG writer 43 is responsible, in this example, for enforcing the scaling of the EPG data as well as the maximum amount of storage 42 that may be used for storing EPG data. Thus, if an EPG loader attempts to store EPG data that is greater in size than the maximum amount of EPG data allowed, then EPG data relating to television programming furthest in the future is removed until the EPG data being stored does not exceed the maximum storage amount allowed.

EPG writer 43 also removes EPG data from storage 42 that is no longer needed or usable. For instance, EPG writer 43 deletes the EPG data from storage 42 for all television programs which have aired before the current half-hour block. For example, at 8:15 a.m., EPG writer 43 will delete all EPG data relating to television programming occurring prior to 8:00 a.m. At 8:35 a.m., EPG writer 43 deletes television programming prior to 8:30 a.m. One reason for deleting EPG data and for limiting the amount of EPG data that can be downloaded is because storage 42 of device 20 is typically limited.

Because EPG services 40 may have a plurality of EPG loaders 60, it is possible that one or more EPG loaders 60 will attempt to add EPG data to the same record or storage locations. More simply, it is possible for a conflict to arise with respect to the EPG data in a variety of contexts. For this reason, EPG services provides various schemes for resolving conflicts. For example, multiple loaders may attempt to update the description for the same program. To resolve this conflict, the EPG writer may be implemented to treat each EPG loader with a different priority. The EPG writer may permit higher priority loaders to take precedence. Another alternative for EPG loaders with equal priorities is to permit the last EPG data written to take precedence and be stored in storage 42. Another alternative is to allow a user or application to select a conflict resolution scheme if conflicting EPG data sources are present. Simply stated, the user could designate a particular EPG data source or provider as having priority over another IPG data source or provider. These are examples of conflict resolution, but other methods orschemes may be employed.

It is also possible for EPG loaders 60 to implement a priority scheme independent of the EPG writer. This implementation, however, reduces the independent of the EPG loaders and forces more rigid interface and implementation constraints upon the development and design of the EPG loaders. In addition, EPG loaders 60 may be time based threads that activate and deactivate at predetermined times.

The retrieval of EPG data from storage 42 is performed by a control module illustrated as EPG control 41, which is an example of a controller API in some embodiments. EPG control 41 may access: EPG data related to the available channels including channel number, channel station, network identification, station broadcast times and associated Uniform Resource Locators (URLs); EPG data related to information related to programming information including title, description, length, rating and other air times; or EPG data relating to whether the television program is purchasable, such as a pay-per-view movie or event. The EPG data can be accessed and retrieved by EPG control 41 in a variety of different combinations.

The ability to access and retrieve EPG data is enhanced by the querying capabilities supplied by EPG control. EPG data can be searched by many parameters, including but not limited to, time, title, description, category or other attribute which may be user defined. In this manner, the EPG data retrieved by an application can be extremely customized for an application. For high performance applications, EPG control 41 is also capable of notifying application 22 when the EPG data within a particular range changes. This enables applications 22 to maintain up to date EPG data available.

Figure 3:
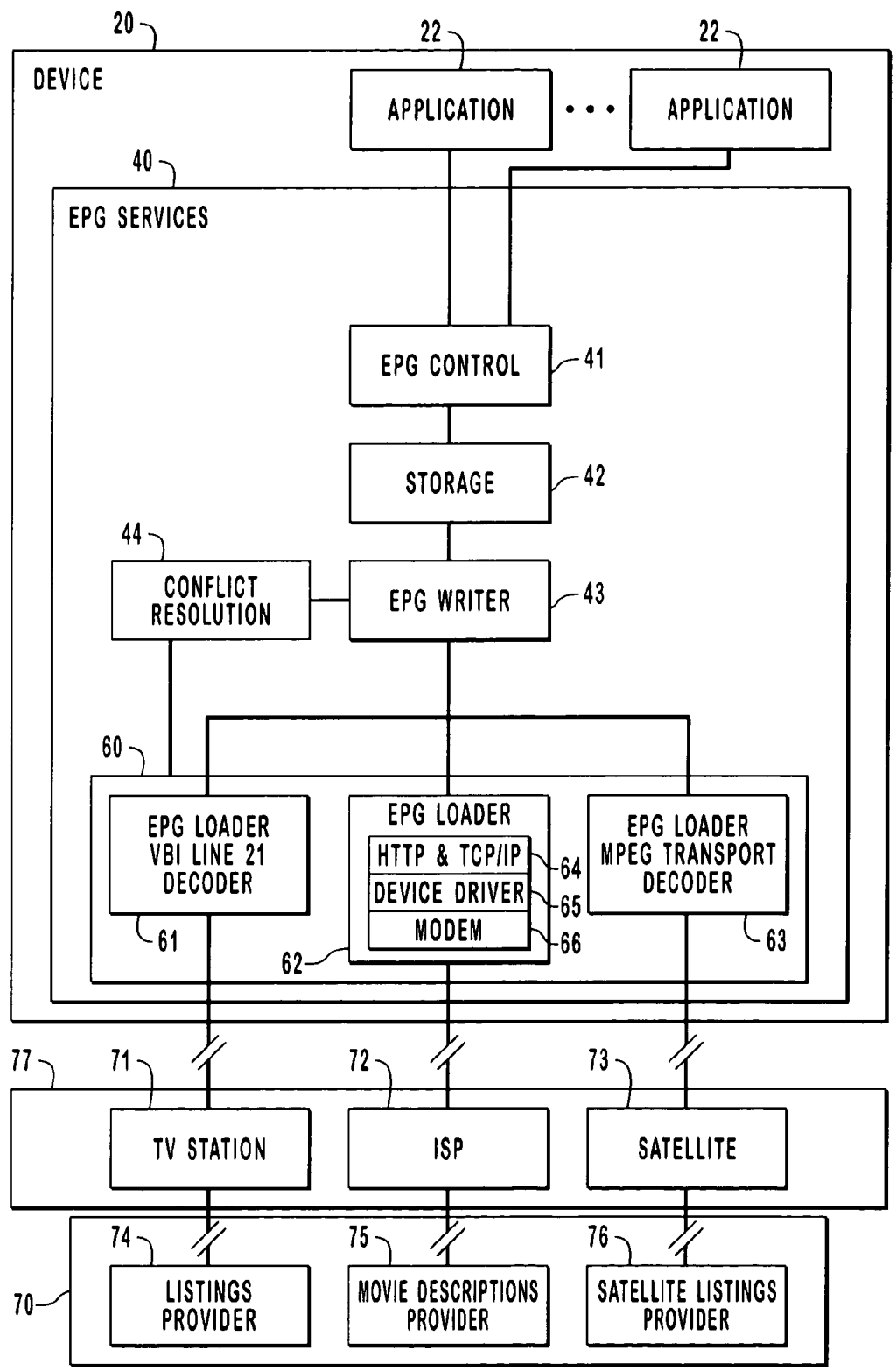
FIG. 3 is a detailed block diagram illustrating the reception of EPG data from an EPG data source and the transmission of EPG data from EPG services to one or more applications.

FIG. 3 is a detailed block diagram of a system implementing one embodiment of the present invention. Device 20 has one or more applications 22 which are capable of using EPG data. The EPG data retrieved by applications 22 may be displayed to a user via a television screen or a computer screen, or may be sent to a printer or other rendering device. EPG data is typically generated by EPG data providers 70, which are shown in FIG. 3 as listings provider 74, movie descriptions provider 75 and satellite listings provider 76. In this example, the EPG data generated by listings provider 74 is transmitted via a television station 71, the EPG data generated by movie descriptions provider 75 is transmitted via an Internet Service Provider (ISP) 72, and the EPG data generated by satellite listings provider 76 is transmitted via satellite 73. It is understood that EPG data can be transmitted in a variety of different methods and that the transmission of EPG data described herein is exemplary rather than limiting. For instance, listings provider 74 may also transmit via ISP 72.

The EPG data provided by EPG data providers 70 is received at device 20 by EPG services 40 which comprises EPG loaders 60. An EPG loader or loader module has the responsibility of collecting EPG data from its native transmission format. EPG loaders 60 comprises one or more specific EPG loaders because as illustrated by the various EPG data providers 70, EPG data can be transmitted in a variety of different methods and formats and new sources or providers of EPG data may become available in the future. For these and other reasons, each loader module collects EPG data, in this embodiment, from a particular source or provider.

FIG. 3 illustrates a Vertical Blanking Interval (VBI) loader module 61, a HTTP loader module 62 and a MPEG loader module 63. VBI loader module 61 is capable of collecting EPG data from the VBI of a television signal or broadcast. HTTP loader module 62 is capable of collecting EPG data over a network such as the Internet, and MPEG loader module 63 is capable of collecting or retrieving EPG data from a digital stream provided by satellite 73. EPG loaders 60 allow EPG data to be collected from any communication system or protocol and are not limited to those illustrated in FIG. 3.

In addition to understanding the transmission medium and format of a particular EPG data provider 70, Each EPG loader module optionally comprises the hardware and software necessary to accomplish this task. This is illustrated by HTTP loader module 62 which comprises a protocol 64, a device driver 65 and a modem 66. For HTTP loader module 62, protocol 64 may be HTTP and TCP/IP if the transmission medium is the Internet. Typically, modem 66 is the hardware required to access the Internet, but access can be accomplished with other hardware components such as a network interface cards. Device driver 65 is typically a software module designed for a particular hardware component such as modem 66.

Conflict resolution 44 is an optional pluggable component that permits a user to specify the actions to be taken when one or more EPG data providers 70 conflict. The action taken by conflict resolution 44 can be specified by the user, the application 22 or the supplier of the EPG data. For instance, the user could specify that conflict resolution 44 cause movie descriptions provider 75 to have priority over satellite listing sprovider 76. In this instance, the portions of the EPG data provided by satellite listings provider 76 that conflict with the EPG data provided by movie descriptions provider 75 are discarded or otherwise handled. Conflict resolution 44 is extensible and can be implemented by attribute as well as by EPG data provider. Conflict resolution 44 can also be implemented at the EPG loader level, whereby the EPG loaders resolve conflicts.

Each EPG loader 60 is capable of interacting with EPG writer 43. EPG writer 43 comprises an applications programming interface (API), in one embodiment, which is used by EPG loaders 60 to interface with EPG writer 43. The collected EPG data is placed in storage 42 by EPG writer 43. Typically, EPG loader 60 creates an instance of EPG writer 43 to perform updates to storage 42, which may be a local or remote data store. EPG writer 43 provides methods having one or more parameters that allow the EPG data collected by EPG loaders 60 to be placed in storage 42 such that the EPG data may be queried and retrieved by EPG control 41.

EPG writer 43 provides the following properties, methods or functions. AudioSubChannel adds a new audio subchannel format and has the parameters languageCode, isMainAudioService, isDolbyEncoded, and programType. AudioSubChannelForScheduleEntry adds a new audio subchannel to a schedule entry and has the parameters scheduleDataID and audioDataID. CategorizationSystem adds a new categorization system to the data store and has the parameters categorizationSystemName and pSystemDataID. CategoryPair adds a new category or subcategory pair to the data store.

CategoryForProgram maps a category pair to a specific program and has the parameters programDataID and categoryPairDataID. Channel adds a new channel to the data store and has the parameters serviceRecordID, channel, network, station, description, channelTtype, startSeconds, and pChannelDataID. ClearAll removes all data from the data store and has no parameters. ClearChannels removes all channel data from the data store and has no parameters. ClearPrograms removes all program data from the data store and has no parameters. ClearScheduleEntries removes all schedule data from the data store. DeleteAudioSubChannel removes a specific audio subchannel from the data store and has the parameter audioDataID.

DeleteCategorizationSystem removes a specific categorization system from the data store and has the parameter systemDataID. DeleteCategoryPair removes a specific category pair from the data store and has the parameters systemDataID, categoryName, and subCategoryName. DeleteChannel removes a specific channel from the data store had has the parameter ChannelObject. DeleteProgram removes a specific program from the data store and has the parameter ProgramObject. DeletePropertyForChannel removes a property from a channel object and has the parameters pChannelObject and propertyName. DeletePropertyForProgram removes a property from a program object and has the parameters pProgramObject and propertyName.

DeletePropertyForScheduleEntry removes a property from a schedule entry and has the parameters pScheduleEntryObject and propertyName. DeletePropertyForWeblink removes a property from a weblink object and has the parameters pWeblinkObject and propertyName. DeleteScheduleEntry removes a specific schedule entry from the data store and has the parameter ScheduleEntryObject. DeleteSharingDay removes a specific sharing day from the data store and has the parameter sharingDayDataID. DeleteVideoSubChannel removes a specific video subchannel from the data store and has the parameter videoDataID. DeleteWeblink removes a specific Web link from the data store and has the parameter WeblinkObject.

EnableDuplicateChecking sets the preferred result for this condition and has the parameter preventDuplicates. Program adds a new program to the data store and has the parameters programTitle, programDescription, yearMade, seconds, and programDataID. PropertyForChannel adds an extensible name-value property to a specific channel and has the parameters channelDataID, name and value. PropertyForProgram adds an extensible name-value property to a specific program and has the parameters programDataID, name, and value. PropertyForScheduleEntry adds an extensible name-value property to a specific schedule entry and has the parameters scheduleEntryDataID, name, and value. PropertyForWeblink adds an extensible name-value property to a specific Weblink and has the parameters weblinkDataID, name, and value.

PurchaseStringForScheduleEntry adds a new purchase string to a specific schedule entry and has the parameters scheduleEntryDataID and purchaseString, which is frequently encrypted. RatingForProgram maps a rating authority and rating to a specific program and has the parameters program DataID, and ratingCode. RemoveOldScheduleEntriesAndPrograms removes schedule entries before a specific time and their associated program, rating, category, property, and Web link data and has the parameter beforeThisTime. ScheduleEntry adds a new schedule entry to the data store and has the parameters eventID, channelDataID, startTime, endTime, cc, rerun, videoDataID, audioDataID, and scheduleEntryDataID. SharingDay adds a unique sharing day to the data store and has the parameters startDay, startTime, endDay, endTime, and pSharingDataID. SharingDayForChannel links a unique sharing day to a particular channel and has the parameters channelDataID, and sharingDataID.

UpdateComplete indicates the current set of updates to the data store is complete. VideoSubChannel indicates the current set of updates to the EPG services storage or data store is completer and has the parameters language, aspectRation, videoSourceHeight, videoSourceWidth, squarePixel, componentType, streamed, and pVideoDataID. VideoSubChannelForScheduleEntry creates a relationship between a schedule entry and a video subchannel and ahs the parameters scheduleEntryDataID and videoDataID.

Weblink adds a new Web link to the data store and has the parameters url, description, startTime, endTime and pWeblinkDataID. WeblinkForChannel maps a Weblink to a specific channel and has the parameters channelDataID, and weblinkDataID. WeblinkForProgram maps a Web link to a specific program and has the parameters programDataID, and weblinkDataID. WeblinkForScheduleEntry maps a Web link to a specific schedule entry and has the parameters scheduleEntryDataID and weblinkDataID.

While EPG loaders 60 place EPG data in storage 42 via EPG writer 43, EPG control 41 performs the functions necessary to retrieve the EPG data from storage 42. EPG control 41, in one embodiment also comprises an API that provides functions and methods to application 22 that assist in the access and retrieval of EPG data. For example, it is necessary in many instances for EPG control 41 to determine if the necessary EPG data is available in storage 42. Functions and methods are also provided by EPG control 41 that are able to access and retrieve EPG data relates to channels.

While a program is typically a unique event, programs may be repeated by a television station and may therefore correspond to one or more schedule entries. To retrieve EPG data concerning a program, EPG control 41 provides methods and functions for use with schedule entries. Programs may also belong to one or more categories or subcategories and EPG control 41 provides functions to retrieve the valid category and subcategory pairs.

Programs also may have one or more ratings which correspond to different rating authorities and EPG control 41 has functions and methods to access ratings. Some applications 22 may request notification of changes to the EPG data that may occur within a particular time range. EPG control 41 services these requests and fires an event when the EPG data changes. Typically, only one event may be requested for each instance of EPG control 41. EPG control 41 provides properties, methods, and events, generally designated as functions, which allow EPG control 41 to be used by an application to access storage 42 or other data store.

The properties of EPG control 41 are as follows. CategorizationSystems retrieves a collection of the names of known schemes for organizing programs by type and has the parameter psystems. DataEndTime returns the time in the future at which the available data ends and has the parameter pEndTime. HighestDataStartTime returns the furthest time in the future when a program starts and has the parameter pStartTime. IsAnyDataAvailable returns information to confirm if valid channel or guide listings exist in the data store and has the parameter pDataAvailable. IsChannelDataAvailable returns information to indicate if channel data exists in the data store and has the parameter pChannelDataAvailable. RatingSystem retrieves a collection of strings for the names of known schemes or systems for organizing content ratings and has the parameter psystems. AvailableChannels retrieves the Channels collection object and has the parameter pChannels.

The methods of EPG control 41 are as follows. CancelCategoryEventRequest disables signaling of OnCategoryUpdate events. CancelChannelEventRequest disables signaling of OnChannelUpdate events. CancelRangeEventRequest disables signaling of OnRangeUpdate events. Categories retrieves a collection of the names of main categories within a categorization system for a given categorization system name and has the parameters categorizationSystemName and pCategories. ChannelsForProviderNetworkName returns channels matching the search value and has the parameters searchString, substringMatch, and pChannels. ChannelsForNumber retrieves a Channels collection object for valid device channels with a particular channel number or tuple and has the parameters serviceSpace, channel, time, and pChannels. ChannelsForProviderName returns channels matching the search value and has the parameters searchString, substringMatch, and pChannels.

IsScheduleDataAvailable returns information indicating whether EPG data is found for a range and has the parameters startTime, endTime, and pScheduleDataAvailable. Program retrieves the Program object representing the program shown on the specified channel at the specified time and has the parameters serviceSpace, channel, time and pProgram. ProgramEndTime retrieves the end time for the program shown on the specified channel at the specified time and has the parameters serviceSpace, channel, time and pEndTime.

ProgramLength retrieves the length in seconds for the program shown and the specified channel and the specified time and has the parameters serviceSpace, channel, time, and pSeconds. ProgramRating retrieves a Rating object for a particular program and has the parameters serviceSpace, channel, time, ratingSystem, and prating. ProgramStartTime retrieves the start time for a particular program shown on the specified channel at the specified time and has the parameters serviceSpace, channel, time, and pStartTime. ProgramTitle retrieves the name of the program shown on the specified channel at the specified time and has the parameters serviceSpace, channel, time, and pTitle.

RequestCategoryUpdateEvent indicates that an event should be fired when any aspect of the known categorization systems changes. RequestChannelUpdateEvent indicates that an event should be fired when a new channel has been added to the specified service space. RequestRangeUpdateEvent returns the update of the time range and has the parameters startTime and endTime. ScheduleEntries returns all schedule time slots matching the query values and has the parameters serviceSpace, channel, startTime, endTime, and pScheduleEntries. ScheduleEntriesForCategories returns programs that match the query values and has the parameters categorizationSystem, categories, startTime, endTime, maxhits, and pScheduleEntries.

ScheduleEntriesForProgramProperty returns programs matching the query values and has the parameters name, value, startTime, endTime, maxHits, and pScheduleEntries. ScheduleEntriesForProperty returns time slots matching query values and has the parameters name, value, startTime, endTime, maxHits, and pScheduleEntries. ScheduleEntriesForStrings retrieves a ScheduleEntries collection object representing all time periods for programs whose title or description includes a particular case-insensitive string which will be shown and has the parameters searchStrings, subStringMatch, findTitle, findDescription, startTime, endTime, maxHits, and pScheduleEntries. ScheduleEntry returns a time slot matching query values, and has the parameters serviceSpace, channel, time, and pScheduleEntry. SubCategories retrieves a collection of the names of subcategories within a categorization system for a given categorization system name and category name and has the parameters categorizationSystemName, categoryIndex, and pSubCategories.

The EPG control 41 events are as follows. OnCategoryUpdate indicates that a new category has been added. OnChannelUpdate indicates that a new channel has been added. OnRangeUpdate indicates that the data within the time range specified by RequestRangeUpdateEvent has changed.

The extensible properties of a channel, program, schedule entry, weblink or other EPG data is retrieved in one embodiment through the use of EPG control objects which include CategoryPair, CategoryPairs, Channel, Channels, GuideRating, GuideRatings, Program, Programs, PurchaseStrings, ScheduleEntry, ScheduleEntries, Weblink, Weblinks, SharingSchedule, MajorMinorSelectorIDs, and Tuple. These objects and associated methods are detailed in the previously incorporated provisional application. While the APIs of the invention have been described herein with reference to specific functions and parameters, the invention also extends to other APIs that provide similar functionality.

EPG services is intended to provide extensibility to EPG data. As illustrated, new sources of EPG data are easily accommodated by a device. The EPG data can be scaled and formatted in a variety of ways. Extensible properties can be added to the channel, program schedule entry, or weblink data and multiple properties may be added to the same set of EPG data, which enhances the ability of applications to search and utilize the stored EPG data.

EPG Data Map is another component of EPG services that is used to retrieve necessary data from EPG services, but should not be used by EPG loaders or other applications or components. EPG Data Map, in one embodiment, is an API.

EPG Data Map provides the following methods and functions. NetworkCallLetters retrieves the network name for a specific service record ID and has the parameters serviceRecordID, time, and pNetworkCallLetters. ProgramEndTime retrieves the end time for the program shown on the specified channel at the specified time and has the parameters serviceRecordID, time, and pEndTime. ProgramLength retrieves the length in seconds for the program shown on the specified channel at the specified time and has the parameters serviceRecordID, time, and pSeconds. ProgramPurchaseString retrieves the available purchase strings for a specified program and has the parameters serviceRecordID, time, cDims, pcDims, and pPurchaseStrings. ProgramRatings retrieves Ratings objects for the program shown on the specified channel at the specified time and has the parameters serviceRecordID, time, and pRatings. ProgramStartTime retrieves the start time for the program shown on the specified channel at the specified time and has the parameters serviceRecordID, time, and pStartTime. ProgramTitle retrieves the name of the program shown on the specified channel at the specified time and has the parameters serviceRecordID, time, and pTitle. ServiceRecordIDForNetworkCallLetters retrieves a ServiceRecordID that matches a specific network call letter string and has the parameters serviceSpace, searchstring, substringMatch, cDims, pcDims, and pServiceRecordIDs. ServiceRecordIDForStationCallLetters retrieves a ServiceRecordID that matches a specific station call letter string and has the parameters serviceSpace, searchString, substringMatch, cDims, pcDims, and pServiceRecordIDs. StationCallLetters retrieves the station name for a specific service record ID and has the parameters serviceRecordID, time, minorChannel, and pStationCallLetters.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a device having a plurality of electronic program guide (EPG) loaders that are each configured to receive EPG data from one or more EPG sources, a method for interfacing the one or more EPG loaders with a database associated with the device, the method comprising:
receiving, at each of a plurality of EPG loaders, EPG data from a different EPG data source;
collecting the EPG data from the EPG loaders at a writer module;

upon determining at the writer module that there is a conflict in the EPG data received from at least two of the different EPG data sources, resolving the conflict according to conflict resolution criteria, wherein the conflict resolution criteria includes giving each EPG loader equal priorities, and wherein resolving the conflict includes giving precedence to EPG data that is received most recently;

calling a function of the writer module to store the EPG data in a database accessible by the device; and executing the function by the writer module, thereby storing the EPG data in the database.

2. A method as in claim 1, further including execution of another function of the writer module that adds a new audio subchannel format to the stored EPG data.

3. A method as in claim 1, further including execution of another function of the writer module that adds a new audio subchannel to a schedule entry in the stored EPG data.

4. A method as in claim 1, wherein the function creates a new categorization system for storing the EPG data.

5. A method as in claim 1, wherein the function adds at least one of a new category and subcategory pair to the database.

6. A method as in claim 5, wherein the function maps a category pair to a specific program.

7. A method as in claim 1, further including execution of another function of the writer module that adds a new EPG channel to the database.

8. A method as in claim 1, wherein a function executed by the writer module removes all EPG data from the database.

9. A method as in claim 1, further including execution of another function of the writer module that removes all channel data from the database.

10. A method as in claim 1, wherein further including execution of another function of the writer module that removes all program data from the database.

11. A method as in claim 1, wherein a function executed by the writer module removes all schedule data from the database.

12. A method as in claim 1, wherein a function executed by the writer module removes a specific audio subchannel from the database.

13. A method as in claim 1, wherein a function executed by the writer module removes a specific categorization system from the database.

14. A method as in claim 1, wherein a function executed by the writer module removes a specific category pair from the database.

15. A method as in claim 1, further including execution of another function of the writer module that removes a specific program from the database.

16. A method as in claim 1, further including execution of another function of the writer module that removes a property from a program object in the database.

17. A method as in claim 1, further including execution of another function of the writer module that removes a property from a schedule entry in the database.

18. A method as in claim 1, wherein a function executed by the writer module removes a property from a weblink object in the database.

19. A method as in claim 1, further including execution of another function of the writer module that removes a specific schedule entry from the database.

20. A method as in claim 1, further including execution of another function of the writer module that sets a preferred result for a condition.

21. A method as in claim 1, further including execution of another function of the writer module that adds a new program to the database.

22. A method as in claim 1, further including execution of another function of the writer module that adds an extensible name-value property to a specific channel.

23. A method as in claim 1, further including execution of another function of the writer module that adds an extensible name-value property to a specific program.

24. A method as in claim 1, further including execution of another function of the writer module that adds an extensible name-value property to a specific schedule entry.

25. A method as in claim 1, further including execution of another function of the writer module that adds an extensible name-value property to a specific Weblink.

26. A method as in claim 1, wherein the function adds a new purchase string to a specific schedule entry.

27. A method as in claim 1, further including execution of another function of the writer module that maps a rating authority and rating to a specific program.

28. A method as in claim 1, further including execution of another function of the writer module that removes schedule entries and associated program, rating, category, property and Weblink data from the database prior to a specific time.

29. A method as in claim 1, further including execution of another function of the writer module that adds a new schedule entry to the database.

30. A method as in claim 1, further including execution of another function of the writer module that indicates a current set of updates to the database is complete.

31. A method as in claim 1, further including execution of another function of the writer module that indicates the current set of updates to the EPG services storage or database is complete.

32. A method as in claim 1, further including execution of another function of the writer module that creates a relationship between a schedule entry and a video subchannel.

33. A method as in claim 1, further including execution of another function of the writer module that adds a Weblink to the database.

34. A method as in claim 1, further including execution of another function of the writer module that maps a Weblink to a specific channel.

35. A method as in claim 1, further including execution of another function of the writer module that maps a Weblink to a specific program.

36. A method as in claim 1, wherein the function maps a Weblink to a specific schedule entry.

37. A method as recited in claim 1, wherein resolving the conflict includes allowing a user to select a conflict resolution scheme.

38. A method as recited in claim 37, wherein allowing the user to select a conflict resolution scheme includes allowing a user to assign a priority to the EPG loaders.

39. A method as recited in claim 1, wherein resolving the conflict includes allowing an application to select a conflict resolution scheme.

40. A method as recited in claim 1, further including:
   calling a second function of a control module operating at the device that accesses the database to retrieve the EPG data and transmits the EPG data to the one or more applications; and
   executing the second function by the control module.

41. A method as in claim 40, further including execution of another function of the control module that retrieves a collection of names of known schemes for organizing programs by type.

42. A method as in claim 40, further including execution of another function of the control module that returns a time in the future at which available data ends.

43. A method as in claim 40, further including execution of another function of the control module that returns a furthest time in the future when a program starts.

44. A method as in claim 40, further including execution of another function of the control module that returns information to confirm if valid channel and guide listings exist in the database.

45. A method as in claim 40, further including execution of another function of the control module that returns information to indicate if channel data exists in the database.

46. A method as in claim 40, further including execution of another function of the control module that retrieves a collection of strings for names of known schemes for organizing content ratings.

47. A method as in claim 40, further including execution of another function of the control module that retrieves a channels collection object.

48. A method as in claim 47, further including execution of another function of the control module that retrieves the Channels collection object for valid device channels with a particular channel number.

49. A method as in claim 40, wherein the function disables signaling of update events.

50. A method as in claim 40, further including execution of another function of the control module that retrieves a collection of names of main categories within a categorization system for a given categorization system name.

51. A method as in claim 40, further including execution of another function of the control module that returns channels matching a search value.

52. A method as in claim 40, further including execution of another function of the control module that returns information indicating whether EPG data is found for a range.

53. A method as in claim 40, further including execution of another function of the control module that retrieves a program object representing a program shown on a specified charnel at a specified time.

54. A method as in claim 40, further including execution of another function of the control module that retrieves an end time for a program.

55. A method as in claim 40, further including execution of another function of the control module that retrieves a length of a program shown.

56. A method as in claim 40, further including execution of another function of the control module that retrieves a rating object for a particular program.

57. A method as in claim 40, further including execution of another function of the control module that retrieves the start time for a particular program.

58. A method as in claim 40, further including execution of another function of the control module that retrieves a name of a program.

59. A method as in claim 40, further including execution of another function of the control module that indicates that an event should be fired when any aspect of a known categorization system of the database changes.

60. A method as in claim 59, further including execution of another function of the control module that indicates that the event should be fired when a new channel has been added to the database.

61. A method as in claim 40, further including execution of another function of the control module that returns updates occurring within a particular time range.

62. A method as in claim 40, further including execution of another function of the control module that returns all schedule time slots matching query values.

63. A method as in claim 40, further including execution of another function of the control module that returns programs that match query values.

64. A method as in claim 40, further including execution of another function of the control module that retrieves a collection object representing all time periods for programs whose title or description includes a particular case-insensitive string.

65. A method as in claim 40, further including execution of another function of the control module that retrieves a collection of subcategory names for a given category name.

66. A method as in claim 40, wherein the second function indicates that a new category has been added to the EPG data.

67. A method as in claim 40, wherein the second function indicates that a new channel has been added to the EPG data.

68. A method as in claim 40, wherein the second function indicates that the EPG data within a particular time range has changed.

69. A computer-readable medium having computer-executable instructions for implementing the method recited in claim 1.

70. A computing device comprising one or more computer readable media having computer-executable instructions for implementing the method recited in claim 1.

* * * * *

UNITED STATES PATENT AND TRADEMARK OFFICE
CERTIFICATE OF CORRECTION

PATENT NO. : 6,990,677 B1
APPLICATION NO. : 09/527137
DATED : January 24, 2006
INVENTOR(S) : Pietraszak et al.

It is certified that error appears in the above-identified patent and that said Letters Patent is hereby corrected as shown below:

In column 6, line 32, after "richness of" insert -- the EPG data can be varied according to title, description, and attributes as well as according --.

In column 13, line 31-32, delete "maxhits" and insert -- maxHits --, therefor.

In column 17, line 41, in Claim 53, delete "charnel" and insert -- channel --, therefor.

Signed and Sealed this

Twenty-first Day of July, 2009

JOHN DOLL
*Acting Director of the United States Patent and Trademark Office*